(12) United States Patent
Abbott, Jr. et al.

(10) Patent No.: US 11,104,029 B2
(45) Date of Patent: Aug. 31, 2021

(54) THREE-DIMENSIONAL (3D) PRINTING (71) Applicant: Hewlett-Packard Development Company, L.P., Houston, TX (US)

(72) Inventors: James Elmer Abbott, Jr., Corvallis, OR (US); Vladek Kasperchik, Corvallis, OR (US); David A. Champion, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 434 days.

(21) Appl. No.: 15/771,561

(22) PCT Filed: Feb. 26, 2016

(86) PCT No.: PCT/US2016/019965
§ 371 (c)(1),
(2) Date: Apr. 27, 2018

(87) PCT Pub. No.: WO2017/146740
PCT Pub. Date: Aug. 31, 2017

(65) Prior Publication Data
US 2018/0361618 A1     Dec. 20, 2018

(51) Int. Cl.
*B28B 1/00* (2006.01)
*B33Y 70/00* (2020.01)
(Continued)

(52) U.S. Cl.
CPC .......... *B28B 1/001* (2013.01); *B29C 35/0272* (2013.01); *B29C 35/0805* (2013.01); *B29C 64/112* (2017.08); *B29C 64/165* (2017.08); *B29C 64/291* (2017.08); *B33Y 10/00* (2014.12); *B33Y 30/00* (2014.12); *B33Y 70/00* (2014.12); *C04B 35/265* (2013.01); *C04B 35/2666* (2013.01); *C04B 35/2683* (2013.01);
(Continued)

(58) Field of Classification Search
CPC .............................. B29C 64/291; B28B 1/001
See application file for complete search history.

(56) References Cited

U.S. PATENT DOCUMENTS 5,980,813 A     11/1999  Narang et al.
10,676,399 B2 *  6/2020  Capobianco ............ B28B 1/001
(Continued)

FOREIGN PATENT DOCUMENTS

CN          104193345       12/2014
WO    WO-W02007114895 A2   10/2007
(Continued)

*Primary Examiner* — Marc C Howell
*Assistant Examiner* — Nicholas J Chidiac
(74) *Attorney, Agent, or Firm* — Dierker & Kavanaugh PC (57) ABSTRACT

In a three-dimensional printing method example, a build material is applied. A first liquid functional material is applied on at least a portion of the build material. The first liquid functional material includes ferromagnetic nanoparticles that are selected from the group consisting of an iron oxide, a ferrite, a combination of the iron oxide and a ferromagnetic metal oxide, and combinations thereof. The build material is exposed to electromagnetic radiation having a frequency ranging from about 5 kHz to about 300 GHz to sinter the portion of the build material in contact with the first liquid functional material.

12 Claims, 3 Drawing Sheets

(51) Int. Cl.
  *B33Y 10/00* (2015.01)
  *B29C 64/165* (2017.01)
  *C04B 35/26* (2006.01)
  *C04B 35/626* (2006.01)
  *B29C 35/08* (2006.01)
  *B29C 35/02* (2006.01)
  *B29C 64/112* (2017.01)
  *B29C 64/291* (2017.01)
  *B33Y 30/00* (2015.01)
  *B29K 105/16* (2006.01)

(52) U.S. Cl.
  CPC ...... *C04B 35/6263* (2013.01); *C04B 35/6264* (2013.01); *B29C 2035/0283* (2013.01); *B29C 2035/0822* (2013.01); *B29C 2035/0855* (2013.01); *B29K 2105/162* (2013.01); *C04B 2235/3215* (2013.01); *C04B 2235/3262* (2013.01); *C04B 2235/3275* (2013.01); *C04B 2235/3279* (2013.01); *C04B 2235/3284* (2013.01); *C04B 2235/3418* (2013.01); *C04B 2235/5454* (2013.01); *C04B 2235/6026* (2013.01); *C04B 2235/667* (2013.01)

(56) References Cited

U.S. PATENT DOCUMENTS

| | | |
|---|---|---|
| 2005/0049739 A1 | 3/2005 | Kramer et al. |
| 2006/0251535 A1 | 11/2006 | Pfeifer et al. |
| 2007/0238056 A1 | 10/2007 | Baumann et al. |
| 2007/0241482 A1* | 10/2007 | Giller .................. G03G 15/224 264/494 |
| 2013/0068131 A1* | 3/2013 | Bermel .................. C09D 11/38 106/31.89 |
| 2014/0231266 A1 | 8/2014 | Sherrer et al. |
| 2015/0266238 A1 | 9/2015 | Ederer et al. |
| 2015/0352785 A1 | 12/2015 | Folgar et al. |
| 2017/0120528 A1* | 5/2017 | Tejada Palacios .... B29C 64/112 |
| 2017/0137327 A1* | 5/2017 | Capobianco ........ C04B 35/6264 |
| 2017/0320128 A1* | 11/2017 | Deters .................... B32B 18/00 |
| 2019/0375014 A1* | 12/2019 | Kernan .................. B22F 10/20 |

FOREIGN PATENT DOCUMENTS

| | | |
|---|---|---|
| WO | WO-2009017648 A1 | 2/2009 |
| WO | WO-2014/134224 | 9/2014 |
| WO | WO-2015/023612 | 2/2015 |
| WO | WO-2015185155 A1 | 12/2015 |

\* cited by examiner

THREE-DIMENSIONAL (3D) PRINTING

BACKGROUND

In addition to home and office usage, inkjet technology has been expanded to high-speed, commercial and industrial printing. Inkjet printing is a non-impact printing method that utilizes electronic signals to control and direct droplets or a stream of ink to be deposited on media. Some commercial and industrial inkjet printers utilize fixed printheads and a moving substrate web in order to achieve high speed printing. Current inkjet printing technology involves forcing the ink drops through small nozzles by thermal ejection, piezoelectric pressure or oscillation onto the surface of the media. This technology has become a popular way of recording images on various media surfaces (e.g., paper), for a number of reasons, including, low printer noise, capability of high-speed recording and multi-color recording.

Inkjet printing has also been used to print liquid functional materials in three-dimensional (3D) printing. 3D printing may be an additive printing process used to make three-dimensional solid parts from a digital model. 3D printing is often used in rapid product prototyping, mold generation, mold master generation, and short run manufacturing. Some 3D printing techniques are considered additive processes because they involve the application of successive layers of material. This is unlike traditional machining processes, which often rely upon the removal of material to create the final part. 3D printing often requires curing or fusing of the building material, which for some materials may be accomplished using heat-assisted extrusion, melting, or sintering, and for other materials may be accomplished using digital light projection technology.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

In some examples of the three-dimensional (3D) printing method and the 3D printing system disclosed herein, an entire layer of a build material (also referred to as build material particles) is exposed to radiation, but a selected region (in some instances less than the entire layer) of the build material is sintered or fused and hardened to become a layer of a 3D part. When microwave energy is used for sintering or fusing, this process has been referred to as Microwave Area Processing. In some examples, a liquid functional material is selectively deposited in contact with the selected region of the build material. The liquid functional material(s) is capable of penetrating into the layer of the build material and spreading onto the exterior surface of the build material. Some liquid functional materials are capable of absorbing radiation and converting the absorbed radiation to thermal energy, which in turn melts or sinters the build material that is in contact with the liquid functional material. This causes the build material to fuse, bind, cure, etc. to form the layer of the 3D part. Other examples of the liquid functional material may be fusing aids, which lower the temperature at which fusing, binding, curing, etc. takes place. Still other liquid functional materials may be used to modify the build material properties, e.g., electrical properties, magnetic properties, thermal conductivity, etc.

During other examples of 3D printing, a liquid functional material is selectively applied to a layer of build material, and then another layer of the build material is applied thereon. The liquid functional material may be applied to this other layer of build material, and these processes may be repeated to form a green body of the 3D part that is ultimately to be formed. The green body may then be exposed to heating and/or radiation to melt or sinter, densify, fuse, and harden the green body to form the 3D part. When microwave energy is used for sintering or fusing, this process has been referred to as Microwave Volume Processing.

Examples of the 3D printing method and the 3D printing system disclosed herein utilize a liquid functional material that contains ferromagnetic nanoparticles dispersed in an aqueous or non-aqueous vehicle. The ferromagnetic nanoparticles are capable of acting as a susceptor to absorb electromagnetic radiation. The liquid functional material, containing the ferromagnetic nanoparticles, is capable of absorbing radiation having a frequency ranging, in some examples, from about 5 kHz to about 300 GHz. The absorbed radiation is converted to thermal energy, which can heat the build material to at least 60° C., and in some instances up to 2500° C. The absorption of energy by the liquid functional material allows for 3D parts to be made from build material that requires high temperatures (e.g., at least 1000° C.) to fuse.

As used herein, the terms "3D printed part," "3D part," or "part" may be a completed 3D printed part or a layer of a 3D printed part.

Figure 1:
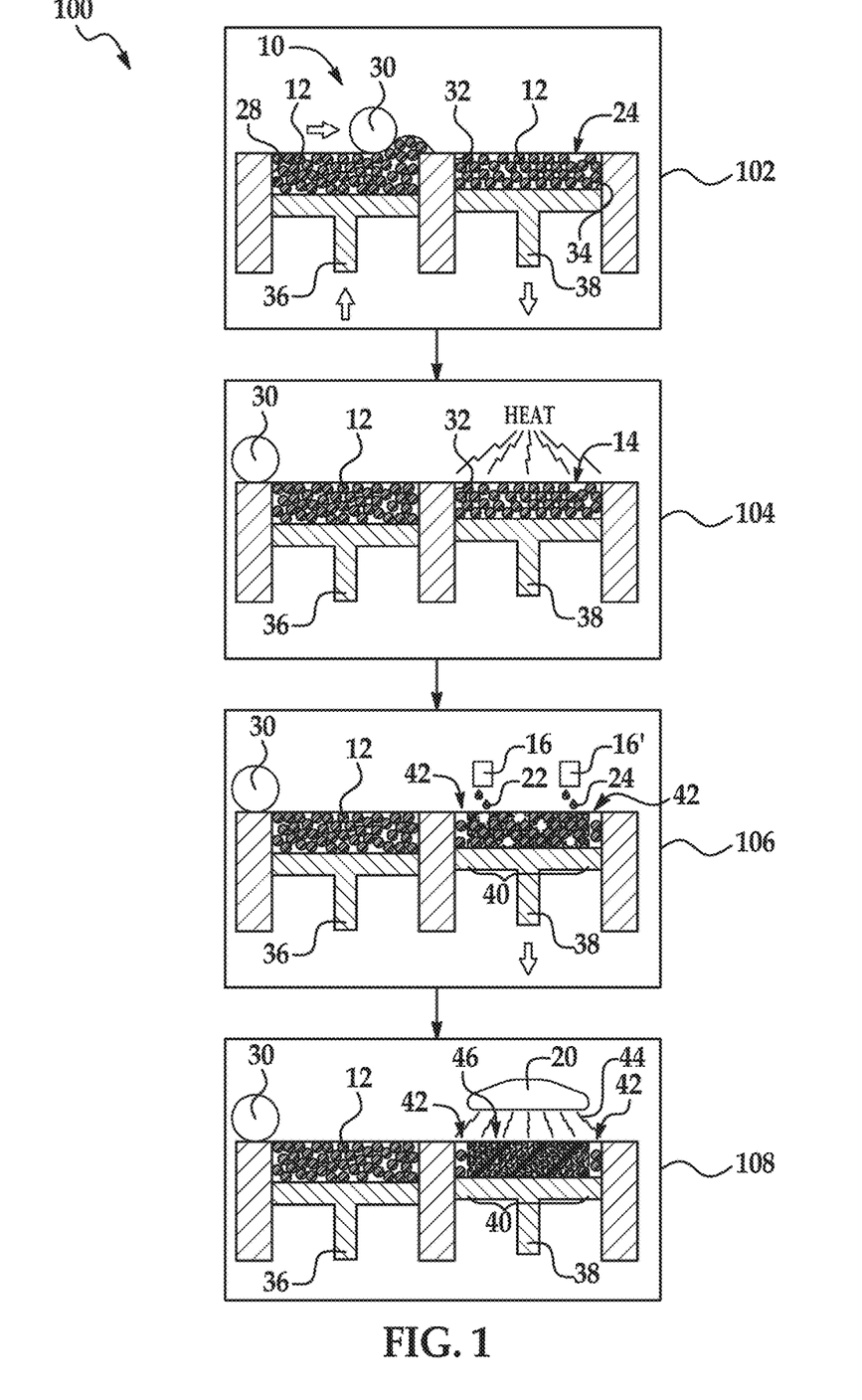
FIG. 1 is a flow diagram illustrating examples of a 3D printing method disclosed herein.

An example of the 3D printing method 100 is depicted in FIG. 1. It is to be understood that the method 100 shown in FIG. 1 will be discussed in detail herein, and in some instances, FIG. 2 will be discussed in conjunction with FIG. 1. As an example, the method 100 may be used to create a well-defined 3D part.

As shown at reference numerals 102 and 202 the methods 100 and 200 each include applying a build material 12. As shown in both FIGS. 1 and 2, one layer 14 of the build material 12 has been applied at reference numerals 102 and 202.

The build material 12 may be a powder. The build material 12 may be a polymeric material, a ceramic material, or a composite material of polymer and ceramic.

Examples of polymeric build material 12 include semi-crystalline thermoplastic materials with a wide processing window of greater than 5° C. (i.e., the temperature range between the melting point and the re-crystallization temperature. Some specific examples of the polymeric build material 12 include polyamides (PAs) (e.g., PA 11/nylon 11, PA 12/nylon 12, PA 6/nylon 6, PA 8/nylon 8, PA 9/nylon 9, PA 66/nylon 66, PA 612/nylon 612, PA 812/nylon 812, PA 912/nylon 912, etc.). Other specific examples of the polymeric build material 12 include polyethylene, polyethylene terephthalate (PET), and an amorphous variation of these materials. Still other examples of suitable polymeric build materials 12 include polystyrenes, polyacetals, polypropylene, polycarbonates, polyester, thermal polyurethanes, fluoropolymers, other engineering plastics, and blends of any two or more of the polymers listed herein. Core shell polymer particles of these materials may also be used.

Examples of suitable ceramic build material 12 include metal oxides, inorganic glasses, carbides, nitrides, and borides. Some specific examples include alumina ($Al_2O_3$), $Na_2O/CaO/SiO_2$ glass (soda-lime glass), silicon nitride ($Si_3N_4$), silicon dioxide ($SiO_2$), zirconia ($ZrO_2$), titanium dioxide ($TiO_2$), or combinations thereof. As an example of one suitable combination, 30 wt % glass may be mixed with 70 wt % alumina.

Any of the previously listed polymeric build materials 12 may be combined with any of the previously listed ceramic build materials 12 to form the composite build material 12. The amount of polymeric build material 12 that may be combined with the ceramic build material 12 may depend on the polymeric build material 12 used, the ceramic particles used 12, and the 3D part 46 to be formed.

The build material 12 may have a melting point ranging from about 50° C. to about 2800° C. As examples, the build material 12 may be a polyamide having a melting point of 180° C., a thermal polyurethane having a melting point ranging from about 100° C. to about 165° C., or a metal oxide having a melting point ranging from about 1000° C. to about 2800° C.

The build material 12 may be made up of similarly sized particles or differently sized particles. In the examples shown herein, the build material 12 includes similarly sized particles. The term "size", as used herein with regard to the build material 12, refers to the diameter of a substantially spherical particle (i.e., a spherical or near-spherical particle having a sphericity of >0.84), or the average diameter of a non-spherical particle (i.e., the average of multiple diameters across the particle). The average particle size of the particles of the build material 12 may be greater than 1 µm, and in some instances, greater than 10 µm. For example, the particle size of the ceramic build material is greater than or equal to 10 µm for materials with a bulk density of greater than or equal to 3. For lower density ceramic build material particles, the particle size can be much larger (e.g., up to about 500 µm). Substantially spherical particles of the particle size disclosed herein have good flowability and can be spread relatively easily. As another example, the average size of the particles of the build material 12 ranges from about 10 µm to about 200 µm. As still another example, the average size of the particles of the build material 12 ranges from 5 µm to about 100 µm. It is to be understood that particle sizes of less than 1 µm are possible if the build material 12 is spread using a slurry based process.

It is to be understood that the build material 12 formed of polymer particles may include, among the particles, a charging agent, a flow aid, or combinations thereof. Charging agent(s) may be added to suppress tribo-charging. Examples of suitable charging agent(s) include aliphatic amines (which may be ethoxylated), aliphatic amides, quaternary ammonium salts (e.g., behentrimonium chloride or cocamidopropyl betaine), esters of phosphoric acid, polyethylene glycolesters, or polyols. Some suitable commercially available charging agents include HOSTASTAT® FA 38 (natural based ethoxylated alkylamine), HOSTASTAT® FE2 (fatty acid ester), and HOSTASTAT® HS 1 (alkane sulfonate), each of which is available from Clariant Int. Ltd.). In an example, the charging agent is added in an amount ranging from greater than 0 wt % to less than 5 wt % based upon the total wt % of the build material 12.

Flow aid(s) may be added to improve the coating flowability of the build material 12 formed of polymer particles. Flow aid(s) may be particularly beneficial when the particles of the build material 12 are less than 25 µm in size. The flow aid improves the flowability of the build material 12 by reducing the friction, the lateral drag, and the tribocharge buildup (by increasing the particle conductivity). Examples of suitable flow aids include tricalcium phosphate (E341), powdered cellulose (E460(ii)), magnesium stearate (E470b), sodium bicarbonate (E500), sodium ferrocyanide (E535), potassium ferrocyanide (E536), calcium ferrocyanide (E538), bone phosphate (E542), sodium silicate (E550), silicon dioxide (E551), calcium silicate (E552), magnesium trisilicate (E553a), talcum powder (E553b), sodium aluminosilicate (E554), potassium aluminum silicate (E555), calcium aluminosilicate (E556), bentonite (E558), aluminum silicate (E559), stearic acid (E570), or polydimethylsiloxane (E900). In an example, the flow aid is added in an amount ranging from greater than 0 wt % to less than 5 wt % based upon the total wt % of the build material 12.

In the examples shown at reference numerals 102 (FIG. 1) and 202 (FIG. 2), applying the build material 12 includes the use of the printing system 10 and 10'. The printing system 10, 10' may include a supply bed 28 (including a supply of the build material 12), a delivery piston 36, a roller 30, a fabrication bed 32 (having a contact surface 34), and a fabrication piston 38. Each of these physical elements may be operatively connected to a central processing unit (i.e., controller, not shown) of the printing system 10, 10'. The central processing unit (e.g., running computer readable instructions stored on a non-transitory, tangible computer readable storage medium) manipulates and transforms data represented as physical (electronic) quantities within the printer's registers and memories in order to control the physical elements to create the 3D part 46. The data for the selective delivery of the build material 12, the liquid functional material 22, etc. may be derived from a model of the 3D part to be formed. For example, the instructions may cause the controller to utilize a build material distributor to dispense the build material 12, and to utilize an applicator (e.g., an inkjet applicator) to selectively dispense the liquid functional material 22.

Figure 2:
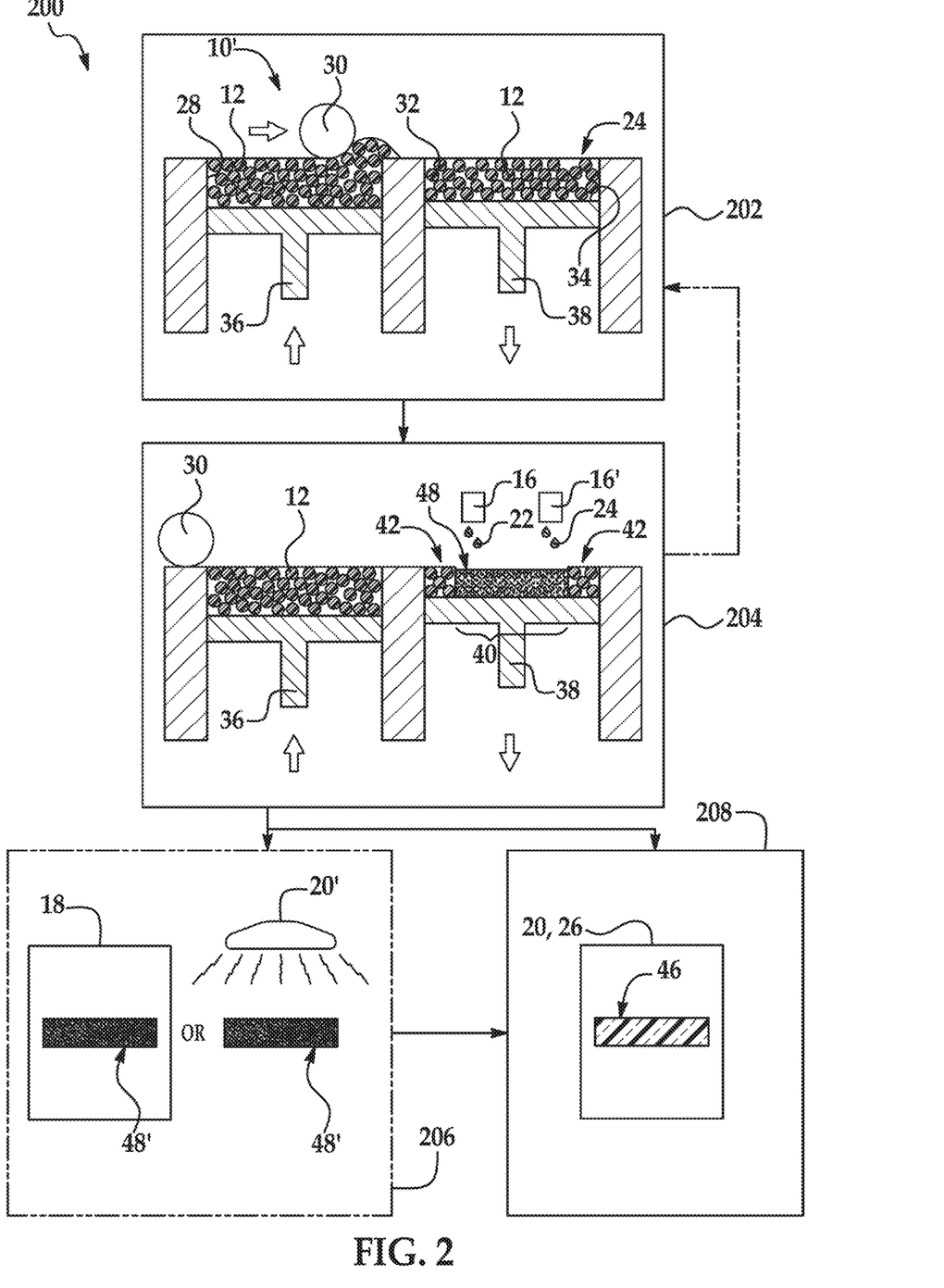
FIG. 2 is a flow diagram illustrating other examples of a 3D printing method disclosed herein.

The delivery piston 36 and the fabrication piston 38 may be the same type of piston, but are programmed to move in opposite directions. In an example, when a layer of the 3D part 46 is to be formed, the delivery piston 36 may be programmed to push a predetermined amount of the build material 12 out of the opening in the supply bed 28 and the fabrication piston 38 may be programmed to move in the opposite direction of the delivery piston 36 in order to increase the depth of the fabrication bed 38. The delivery piston 36 will advance enough so that when the roller 30 pushes the build material 12 into the fabrication bed 32 and onto the contact surface 34, the depth of the fabrication bed 32 is sufficient so that a layer 24 of the build material 12 may be formed in the bed 32. The roller 30 is capable of spreading the build material 12 into the fabrication bed 32 to form the layer 14, which is relatively uniform in thickness. In an example, the thickness of the layer 14 ranges from about 90 µm to about 110 µm, although thinner or thicker layers may also be used. For example, the thickness of the layer 14 may range from about 50 µm to about 1000 µm.

It is to be understood that the roller 30 may be replaced by other tools, such as a blade that may be useful for spreading different types of powders, or a combination of a roller and a blade.

The supply bed 28 that is shown is one example, and could be replaced with another suitable delivery system to supply the build material 12 to the fabrication bed 32. Examples of other suitable delivery systems include a hopper, an auger conveyer, or the like.

The fabrication bed 32 that is shown is also one example, and could be replaced with another support member, such as a platen, a print bed, a glass plate, or another build surface.

As shown at reference numeral 104 in FIG. 1, in some examples of the 3D printing method, the layer 14 of the build material 12 may be exposed to heating after the layer 14 is applied in the fabrication bed 32 (and prior to selectively applying the liquid functional material 22). Heating is performed to pre-heat the build material 12, and thus the heating temperature may be below the melting point of the build material 12. As such, the temperature selected will depend upon the build material 12 that is used. As examples, the heating temperature may be from about 5° C. to about 50° C. below the melting point of the build material 12. In an example, the heating temperature ranges from about 50° C. to about 350° C. In another example, the heating temperature ranges from about 150° C. to about 170° C.

Pre-heating the layer 14 of the build material 12 may be accomplished using any suitable heat source that exposes all of the build material 12 in the fabrication bed 32 to the heat. Examples of the heat source include a thermal heat source (e.g., a heater (not shown) of the fabrication bed 32) or an electromagnetic radiation source (e.g., infrared (IR), microwave, etc.).

After the build material 12 is applied, as shown at reference numerals 102 and 202 and/or after the build material 12 is pre-heated as shown at reference numeral 104, the liquid functional material 22 is selectively applied on at least a portion 40 of the build material 12, in the layer 14, as shown at reference number 106 (FIG. 1) and 204 (FIG. 2).

The liquid functional material 22 may be dispensed from any suitable applicator. As illustrated in FIGS. 1 and 2 at reference numerals 106 and 204, the liquid functional material 22 may be dispensed from an inkjet printhead 16, such as a thermal inkjet printhead or a piezoelectric inkjet printhead. The printhead 16 may be a drop-on-demand printhead or a continuous drop printhead.

The printheads 16 may be selected to deliver drops the liquid functional material 22 at a resolution ranging from about 300 dots per inch (DPI) to about 1200 DPI. In other examples, the printhead 16 may be selected to be able to deliver drops of the liquid functional material 22 at a higher or lower resolution. The drop velocity may range from about 5 m/s to about 24 m/s and the firing frequency may range from about 1 kHz to about 100 kHz. The printhead 16 may include an array of nozzles through which it is able to selectively eject drops of fluid. In one example, each drop may be on the order of about 10 pico liters (pi) per drop, although it is contemplated that a higher or lower drop size may be used. In some examples, printhead 16 is able to deliver variable size drops of the liquid functional material 22.

The inkjet printhead(s) 16 may be attached to a moving XY stage or a translational carriage (neither of which is shown) that moves the inkjet printhead(s) 16 adjacent to the fabrication bed 32 in order to deposit the liquid functional material 22 in desirable area(s) 40. In other examples, the printhead 16 may be fixed while a support member (supporting the fabrication bed 32) is configured to move relative thereto. The inkjet printhead(s) 16 may be programmed to receive commands from a central processing unit and to deposit the liquid functional material 22 according to a pattern of a cross-section for the layer of the 3D object that is to be formed.

In an example, the printhead 16 may have lengths that enable them to span the whole width of the member (not shown) supporting the fabrication bed 32 in a page-wide array configuration. As used herein, the term 'width' generally denotes the shortest dimension in the plane parallel to the X and Y axes of the support member, and the term 'length' denotes the longest dimension in this plane. However, it is to be understood that in other examples the term 'width' may be interchangeable with the term 'length'. In an example, the page-wide array configuration is achieved through a suitable arrangement of multiple printheads 16. In another example, the page-wide array configuration is achieved through a single printhead 16. In this other example, the single printhead 16 may include an array of nozzles having a length to enable them to span the width of the support member. This configuration may be desirable for single pass printing. In still other examples, the printhead(s) 16 may have a shorter length that does not enable them to span the whole width of the support member. In these other examples, the printhead(s) 16 may be movable bi-directionally across the width of the support member. This configuration enables selective delivery of the liquid functional material 22 across the whole width and length of the support member using multiple passes.

In one example, the liquid functional material 22 includes a liquid vehicle, the microwave or radio frequency (RF) radiation absorbing ferromagnetic nanoparticles, and a dispersing agent. In some examples, the liquid functional material 22 consists of these components, with no other components.

As used herein, "liquid vehicle," and "vehicle" may refer to the liquid fluid in which the microwave or RF radiation absorbing ferromagnetic nanoparticles are placed to form the liquid functional material 22. A wide variety of liquid vehicles may be used with the liquid functional material 22 and methods of the present disclosure. The liquid vehicle may include water alone or in combination with a mixture of a variety of additional components. Examples of these additional components may include organic co-solvent(s), surfactant(s), antimicrobial agent(s), anti-kogation agent(s), and/or chelating agent(s).

The liquid vehicle may include an organic co-solvent present in total in the liquid functional material 22 in an amount ranging from about 1 wt % to about 50 wt % (based on the total wt % of the liquid functional material 22), depending, at least in part, on the jetting architecture. In an example, the co-solvent in present in the liquid functional material 22 in an amount of about 10 wt % based on the total wt % of the liquid functional material 22. It is to be understood that other amounts outside of this example and range may also be used. Classes of organic co-solvents that may be used include aliphatic alcohols, aromatic alcohols, diols, glycol ethers, polyglycol ethers, 2-pyrrolidinones, caprolactams, formamides, acetamides, glycols, and long chain alcohols. Examples of these co-solvents include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. In some examples, the liquid vehicle may include 1-(2-hydroxyethyl)-2-pyrrolidone, 2-pyrrolidone, Di-(2-Hydoxyethyl)-5, 5-Dimethylhydantoin (commercially available as DANTOCOL® DHE from Lonza), 2-methyl-1,3-propanediol, neopentyl glycol, 2-ethyl-1,3-hexanediol, diethylene glycol, triethylene glycol, tetraethylene glycol, 3-methyl-1,3-butanediol, etc.

As mentioned above, the liquid vehicle may also include surfactant(s). As an example, the liquid functional material 22 may include non-ionic and/or anionic surfactants, which may be present in an amount ranging from about 0.01 wt % to about 5 wt % based on the total wt % of the liquid functional material 22. In at least some examples, the liquid vehicle may include a silicone-free alkoxylated alcohol surfactant such as, for example, TEGO® Wet 510 (EvonikTegoChemie GmbH) and/or a self-emulsifiable wetting agent based on acetylenic diol chemistry, such as, for example, SURFYNOL® SE-F (Air Products and Chemicals, Inc.). Other suitable commercially available surfactants include SURFYNOLO 465 (ethoxylatedacetylenic diol), SURFYNOL® CT-211 (now CARBOWET® GA-211, non-ionic, alkylphenylethoxylate and solvent free), and SURFYNOL® 104 (non-ionic wetting agent based on acetylenic diol chemistry), (all of which are from Air Products and Chemicals, Inc.); ZONYL® FSO (a.k.a. CAPSTONE®, which is a water-soluble, ethoxylated non-ionic fluorosurfactant from Dupont); TERGITOL® TMN-3 and TERGITOL® TMN-6 (both of which are branched secondary alcohol ethoxylate, non-ionic surfactants), and TERGITOL® 15-S-3, TERGITOL® 15-S-5, and TERGITOL® 15-S-7 (each of which is a secondary alcohol ethoxylate, non-ionic surfactant) (all of the TERGITOL® surfactants are available from The Dow Chemical Co.).

The liquid vehicle may also include antimicrobial agent(s). Suitable antimicrobial agents include biocides and fungicides. Example antimicrobial agents may include the NUOSEPT® (Ashland Inc.), UCARCIDE™ or KORDEK™ (Dow Chemical Co.), and PROXEL® (Arch Chemicals) series, and combinations thereof. In an example, the liquid functional material 22 may include a total amount of antimicrobial agents that ranges from about 0.1 wt % to about 0.25 wt %.

An anti-kogation agent may also be included in the liquid vehicle. Kogation refers to the deposit of dried ink on a heating element of a thermal inkjet printhead. Anti-kogation agent(s) is/are included to assist in preventing the buildup of kogation. Examples of suitable anti-kogation agents include oleth-3-phosphate (commercially available as CRODAFOS™ O3A or CRODAFOS™ N-3 acid) or dextran 500 k. Other suitable examples of the anti-kogation agents include CRODAFOS™ HCE (phosphate-ester from Croda Int.), CRODAFOS® N10 (oleth-10-phosphate from Croda Int.), or DISPERSOGEN® LFH (polymeric dispersing agent with aromatic anchoring groups, acid form, anionic, from Clariant), etc. The anti-kogation agent may be present in the liquid functional material 22 in an amount ranging from about 0.1 wt % to about 1 wt % of the total wt % of the liquid functional material 22.

The liquid vehicle may also include a chelating agent. Examples of suitable chelating agents include disodium ethylenediaminetetraacetic acid (EDTA-Na) and methylglycinediacetic acid (e.g., TRILON® M from BASF Corp.). Whether a single chelating agent is used or a combination of chelating agents is used, the total amount of chelating agent(s) in the liquid functional material 22 may range from 0 wt % to about 1 wt % based on the total wt % of the liquid functional material 22.

The balance of the vehicle is water or a non-aqueous solvent. Water may be suitable for thermal inkjet formulations, and the non-aqueous solvent may be suitable for piezoelectric inkjet formulations. Any of the previously listed co-solvents may make up the balance of the non-aqueous ink vehicle.

The liquid functional material 22 (shown in FIGS. 1 and 2) also includes the microwave or RF radiation absorbing ferromagnetic nanoparticles. The microwave or RF radiation absorbing ferromagnetic nanoparticles may be incorporated into the liquid functional material 22 in the form of the particles themselves or in the form of precursor dispersion. The precursor dispersion may include water, the dispersing agent, and the ferromagnetic nanoparticles. As such, the precursor dispersion may contribute component(s) of the vehicle to the liquid functional material 22. Preparation of the precursor dispersion will be discussed in more detail below.

The microwave or RF radiation absorbing ferromagnetic nanoparticles have high microwave or RF radiation (i.e., frequency ranging from about 5 kHz to about 300 GHz) absorptivity. By highly absorptive, it is meant that the ferromagnetic nanoparticles have a loss tangent of >0.01 for the frequency of the electromagnetic radiation (delivered during the printing method) at a temperature ranging from about 18° C. to about 200° C. In one example, the ferromagnetic nanoparticles have a loss tangent of >0.01 for frequencies ranging from about 5 kHz to about 300 GHz at the given temperature range. In another example, the ferromagnetic nanoparticles have a loss tangent of >0.01 for frequencies ranging from about 800 MHz to about 15 GHz at the given temperature range. In still another example, the ferromagnetic nanoparticles have a loss tangent of >0.01 for frequencies ranging from about 300 MHz to about 300 GHz at the given temperature range.

The microwave or RF radiation absorbing ferromagnetic nanoparticles may be heated in order for the nanoparticles to achieve the level of absorption disclosed herein and/or to achieve a desirable initial heating rate. In some examples, pre-heating to a temperature ranging from about 100° C. to about 250° C. prior to radiation exposure may help ferromagnetic nanoparticles with a lower loss tangent absorb better.

Examples of the microwave or RE radiation absorbing ferromagnetic nanoparticles of the liquid functional material 22 include oxides of iron (II), iron (III), or iron (II, III) (i.e., magnetite). Other examples of the microwave or RF radiation absorbing ferromagnetic nanoparticles include a combination of iron (i.e., iron (II) iron (III), or iron (II, III)) oxide and a ferromagnetic metal oxide. Examples of suitable ferromagnetic metal oxides that may be combined with iron oxide to form the microwave or RF radiation absorbing ferromagnetic nanoparticles of the liquid functional material 22 include cobalt (II) oxide, cobalt (II, III) oxide, manganese (III) oxide, other suitable ferromagnetic metal oxides, and combinations thereof. Still other examples of the microwave or RF radiation absorbing ferromagnetic nanoparticles include ferrites or complex ferrites. As specific examples, the ferrites may include barium ferrite ($BaFe_{12}O_{19}$), cobalt ferrite ($CoFe_2O_4$), cobalt-zinc ferrite ($Co_{0.5}Zn_{0.5}Fe_2O_4$), nickel ferrite ($NiFe_2O_4$), nickel-zinc ferrite ($Ni_{0.5}Zn_{0.5}Fe_2O_4$), zinc ferrite ($ZnFe_2O_4$), or the like. An example of the complex ferrite includes cobalt and manganese $x(Fe_2O_3)*y(CoO)*z(Mn_2O_3)$ nanoparticles. While several examples have been provided, it is to be understood that any other ferrites with ferromagnetic properties may be used.

The microwave or RF radiation absorbing ferromagnetic nanoparticles may be present in the liquid functional material 22 in an amount ranging from about 0.1 wt % to about 50 wt % based upon the total wt % of the liquid functional material 22. In an example, the amount of the microwave or RF radiation absorbing ferromagnetic nanoparticles ranges from about 14 wt % to about 40 wt % based upon the total wt % of the liquid functional material 22. In another example, the amount of the microwave or RF radiation absorbing ferromagnetic nanoparticles ranges from greater than 30 wt % to about 40 wt % based upon the total wt % of the liquid functional material 22. This weight percentage accounts for the weight percent of the active microwave or RF radiation absorbing ferromagnetic nanoparticles present in the liquid functional material 22, and does not account for the total weight percent of the precursor dispersion in the liquid functional material 22. As such, the weight percentages given for the ferromagnetic nanoparticles do not account for any other components (e.g., water, dispersing agent(s)) that may be present when the ferromagnetic nanoparticles are part of the precursor dispersion. It is believed that the ferromagnetic nanoparticle loadings provide a balance between the liquid functional material 22 having jetting reliability and microwave radiation absorbance efficiency.

In an example, the microwave or RF radiation absorbing ferromagnetic nanoparticles have a particle diameter (i.e., particle size or average particle size) ranging from about 2 nm to about 300 nm. In another example, the particle diameter of the microwave or RF radiation absorbing ferromagnetic nanoparticles ranges from about 2 nm to about 150 nm. In still another example, the particle diameter of the microwave or RF radiation absorbing ferromagnetic nanoparticles ranges from about 3 nm to about 60 nm.

The microwave or RF radiation absorbing ferromagnetic nanoparticles in the liquid vehicle may, in some instances, be dispersed with a dispersing agent. The dispersing agent helps to uniformly distribute the microwave or RF radiation absorbing ferromagnetic nanoparticles throughout the liquid functional material 22. Some examples of the dispersing agent include a) a small molecule anionic dispersant; or b) a short chain polymeric dispersant; or c) a small molecule non-ionic dispersant; or d) a combination of a) or b) with c). The small molecule anionic dispersant may be a monomeric carboxylic acid containing two or more carboxylic groups per molecule (e.g., citric acid) while the short chain polymeric dispersant may be a short chain polycarboxylic acid having a molecular weight less than 10,000 Da (e.g., CARBOSPERSE® K7028 (M~2,300 Da) available from Lubrizol Corporation, which is a partially neutralized low molecular weight water soluble acrylic acid polymer). When utilized, the small molecule anionic dispersant or short chain polymeric dispersant may be present in an amount ranging from about 0.1 wt % to about 20 wt % of the total wt % of the microwave or RF radiation absorbing ferromagnetic nanoparticles. The anionic dispersant short chain polymeric dispersant may impart a negative charge on the surface of the microwave or RF radiation absorbing ferromagnetic nanoparticles, which may contribute to the particle's stability in the liquid functional material 22. The small molecule non-ionic dispersant may be a polyether alkoxysilane coupling agent (e.g., SILQUEST® A-1230 available from Momentive Performance Materials). When utilized, the small molecule anionic dispersant may be present in an amount ranging from about 0.5 wt % to about 100 wt % of the total wt % of the microwave or RF radiation absorbing ferromagnetic nanoparticles. In an example, the total amount of small molecule anionic dispersant(s) in the liquid functional material 22 ranges from about 1 wt % to about 30 wt % based on the total wt % of the microwave or RF radiation absorbing ferromagnetic nanoparticles.

As previously mentioned, the ferromagnetic nanoparticles may be present in a precursor dispersion before being incorporated into the liquid functional material 22. In one example, the precursor dispersion may be prepared by adding the ferromagnetic nanoparticles or nano-powder (e.g., $Fe_3O_4$) to a millbase to form a mixture. The millbase may include water and the dispersing agent(s) (e.g., the small molecule anionic dispersant, the small molecule non-ionic dispersant, or a combination thereof). The mixture may be milled to reduce the average particle diameter of the ferromagnetic particles to less than 220 nm, and to form the precursor dispersion. Any suitable milling technique may be used. In an example, an Ultra-Apex Bead Mill (Kotobuki) may be used with 50 μm zirconia beads. The rotor speed of the Ultra-Apex Bead Mill may range from about 8 m/s to about 10 m/s. In another example, a laboratory shaker may be used with 650 μm or smaller zirconium beads. In still another example, a Fritsch mill may be used with 200 μm or smaller zirconia beads. The rotor speed of the Fritsch mill may be 400 rotations per minute. In any of these examples, the mixture may be milled for about 1 hour to about 10 hours. Alternatively, in any of the above examples, the mixture may be alternated between being milled for about 1 minute to about 3 minutes and resting for about 3 minutes to about 10 minutes for about 100 repetitions to about 140 repetitions. The precursor dispersion may be collected from the beads. In an example, the precursor dispersion includes from about 15 wt % to about 20 wt % of the microwave or RF radiation absorbing ferromagnetic nanoparticles.

The precursor dispersion may then be incorporated into other components of the liquid vehicle to form an example of the liquid functional material 22. In this example, the water from the precursor dispersion forms part of the vehicle, and thus this example of the liquid functional material 22 is aqueous.

In examples of the 3D printing method disclosed herein, it is to be understood that one liquid functional material 22 may be used to form a 3D part 46, or multiple liquid functional materials 22, each containing microwave or RF radiation absorbing ferromagnetic nanoparticles, may be used to form the 3D part 46.

Additionally, in some examples of the 3D printing method (as shown at reference numbers 106 of FIG. 1 and 204 of FIG. 2), a second liquid functional material 24 is also selectively applied to the build material 12. The second liquid functional material 24 may be applied on the same portion(s) 40 of the build material 12 in contact with the first liquid functional material 22. Application of the second liquid functional material 24 may shorten the overall fusing time by increasing the initial heating rate of the portion(s) 40. However, the active material in the second liquid functional material 24 may burn out at higher temperatures (e.g., greater than 500° C.) that are used to fuse/sinter certain build materials 12, and thus may not be capable of heating these build materials 12 to sufficient fusing/sintering temperatures. Thus, the second liquid functional material 24 may heat the build material 12 to an initial temperature, and then the first liquid functional material 22 may heat (through the transfer of thermal energy) the build material 12 to a temperature sufficient to fuse or sinter the build material 12. Together, the second liquid functional material 24 and the first liquid functional material 22 may promote the transfer of the thermal energy sooner (than if the first liquid functional material 22 alone were used) and may enable the fusing/sintering temperature of the build material 12 to be reached.

The second liquid functional material 24 may be a water-based dispersion including a radiation absorbing binding agent (i.e., the active material). In some instances, the liquid functional material 24 consists of water and the active material. In other instances, the second liquid functional material 24 may be a fusing aid, which functions to lower the temperature at which the build material 12 fuses. An example of the fusing aid type of second liquid functional material 24 is an aqueous dispersion of fusing aid particles, such as silica ($SiO_2$) particles. In still other instances, the liquid functional material 24 may further include dispersing agent(s), antimicrobial agent(s), anti-kogation agent(s), and combinations thereof.

In some examples, the active material in the second liquid functional material 24 may be any suitable material that absorbs electromagnetic radiation having a frequency ranging from about 5 kHz to about 300 GHz. Examples of the active material include microwave or RF radiation-absorbing susceptors, such as carbon black or graphite.

The active material may alternatively or also absorb radiation at other frequencies and wavelengths. As examples, the active material may be capable of absorbing IR radiation (i.e., a wavelength of about 700 nm to about 1 mm, which includes near-IR radiation (i.e., a wavelength of 700 nm to 1.4 μm)), ultraviolet radiation (i.e., a wavelength of about 10 nm to about 390 nm), visible radiation (i.e., a wavelength from about 390 nm to about 700 nm), or a combination thereof, in addition to microwave radiation (i.e., a wavelength of about 1 mm to 1 about m) and/or radio radiation (i.e., a wavelength from about 1 m to about 1000 m).

As one example, the second liquid functional material 24 may be an ink-type formulation including carbon black, such as, for example, the ink formulation commercially known as CM997A available from HP Inc. Within the liquid functional material 24, the carbon black may be polymerically dispersed. The carbon black pigment may also be self-dispersed within the liquid functional material 24 (e.g., by chemically modifying the surface of the carbon black). Examples of inks including visible light enhancers are dye based colored ink and pigment based colored ink, such as the commercially available inks CE039A and CE042A, available from Hewlett-Packard Company.

Examples of suitable carbon black pigments that may be included in the liquid functional material 24 include those manufactured by Mitsubishi Chemical Corporation, Japan (such as, e.g., carbon black No. 2300, No. 900, MCF88, No. 33, No. 40, No. 45, No. 52, MA7, MA8, MA100, and No. 2200B); various carbon black pigments of the RAVEN® series manufactured by Columbian Chemicals Company, Marietta, Ga., (such as, e.g., RAVEN® 5750, RAVEN® 5250, RAVEN® 5000, RAVEN® 3500, RAVEN® 1255, and RAVEN® 700); various carbon black pigments of the REGAL® series, the MOGUL® series, or the MONARCH® series manufactured by Cabot Corporation, Boston, Mass., (such as, e.g., REGAL® 400R, REGAL® 330R, and REGAL® 660R); and various black pigments manufactured by Evonik Degussa Corporation, Parsippany, N.J., (such as, e.g., Color Black FW1, Color Black FW2, Color Black FW2V, Color Black FW18, Color Black FW200, Color Black S150, Color Black S160, Color Black S170, PRINTEX® 35, PRINTEX® U, PRINTEX® V, PRINTEX® 140U, Special Black 5, Special Black 4A, and Special Black 4).

As mentioned above, the carbon black pigment may be polymerically dispersed within the second liquid functional material 24 by a polymeric dispersant having a weight average molecular weight ranging from about 12,000 to about 20,000. In this example, the liquid functional material 24 includes the carbon black pigment (which is not surface treated), the polymeric dispersant, and water (with or without a co-solvent). When included, an example of the co-solvent may be 2-pyrollidinone. The polymeric dispersant may be any styrene acrylate or any polyurethane having its weight average molecular weight ranging from about 12,000 to about 20,000. Some commercially available examples of the styrene acrylate polymeric dispersant are JONCRYL® 671 and JONCRYL® 683 (both available from BASF Corp.). Within the liquid functional material 24, a ratio of the carbon black pigment to the polymeric dispersant ranges from about 3.0 to about 4.0. In an example, the ratio of the carbon black pigment to the polymeric dispersant is about 3.6. It is believed that the polymeric dispersant contributes to the carbon black pigment exhibiting enhanced electromagnetic radiation absorption.

The amount of the active material or fusing aid particles that is present in the second liquid functional material 24 ranges from greater than 0 wt % to about 40 wt % based on the total wt % of the liquid functional material 24. In other examples, the amount of the active material or fusing aid particles in the liquid functional material 24 ranges from about 0.3 wt % to 30 wt %, or from about 1 wt % to about 20 wt %. It is believed that these active material loadings provide a balance between the liquid functional material 24 having jetting reliability and heat and/or electromagnetic radiation absorbance efficiency.

As illustrated in FIGS. 1 and 2 at reference numerals 106 and 204, the liquid functional material 24 may be dispensed from an inkjet applicator, such as an inkjet printhead 16'. The printhead(s) 16' may be any of the printheads described above in relation to the printhead(s) 16 (which is used to apply the first liquid functional material 22). The printhead(s) 16' may also function (e.g., move, receive commands from the central processing unit, etc.) and have the same dimensions (e.g., length and width) as the printhead(s) 16 described above. The first liquid functional material 22 and the second liquid functional material 24 may be applied in a single pass or sequentially.

In the examples shown in FIGS. 1 and 2 at reference numerals 106 and 204, the printheads 16 and 16' selectively apply the first liquid functional material 22 and the second liquid functional material 24 (respectively) on those portion(s) 40 of the layer 14 that are to be fused or sintered to become the first layer of the 3D part 46. As an example, if the 3D part that is to be formed is to be shaped like a cube or cylinder, the liquid functional material(s) 22, 24 will be deposited in a square pattern or a circular pattern (from a top view), respectively, on at least a portion of the layer 14 of the build material 12. In the examples shown in FIGS. 1 and 2 at reference numerals 106 and 204, the liquid functional materials 22 and 24 are deposited in a square pattern on the portion 40 of the layer 14 and not on the portions 42.

The liquid functional materials 22, 24 are able to penetrate, at least partially, into the layer 14 of the build material 12. The build material 12 may be hydrophobic, and the presence of a co-solvent and/or a dispersant (e.g., dispersing agent) in the liquid functional material(s) 22, 24 may assist in obtaining a particular wetting behavior.

After the liquid functional material(s) 22, 24 is/are applied, the build material 12 with the liquid functional material(s) 22, 24 thereon is exposed to electromagnetic radiation 44 having a frequency ranging from about 5 kHz to about 300 GHz to form a fused 3D part 46. This is shown at reference numerals 108 (FIG. 1), and 208 (FIG. 2). In some examples, pre-heating the build material 12 with the liquid functional material(s) 22, 24 thereon to a temperature ranging from about 100° C. to about 250° C. prior to radiation exposure may help ferromagnetic nanoparticles with a lower loss tangent absorb better.

As shown in FIG. 1 at reference numeral 108, the entire layer 14 of the build material 12 may be exposed to the electromagnetic radiation 44.

As illustrated at reference numeral 108, the electromagnetic radiation 44 having the frequency ranging from about 5 kHz to about 300 GHz may be emitted from a radiation source 20. Any radiation source 20 may be used that emits electromagnetic radiation 44 having the frequency ranging from about 5 kHz to about 300 GHz. In some examples, the radiation source 20 may emit electromagnetic radiation 44 having the frequency ranging from about 800 MHz to about 15 GHz. Some specific radiation sources 20 include 915 MHz microwave energy sources and 2.45 GHz microwave energy sources. Examples of suitable radiation sources include a magnetron that emits microwaves and lasers with the desirable electromagnetic frequencies.

The radiation source 20 that is used depends, in part, on the type of ferromagnetic nanoparticles in the liquid functional material 22. For example, an RF radiation source may not be suitable for dielectric ferromagnetic nanoparticles.

The radiation source 20 may be attached, for example, to a carriage that also holds the inkjet printheads 16, 16'. The carriage may move the radiation source 20 into a position that is adjacent to the fabrication bed 32. The radiation source 20 may be programmed to receive commands from the central processing unit and to expose the layer 14, including the liquid functional material(s) 22, 24 and build material 12, to electromagnetic radiation 44.

Alternatively, the layer 14 may be removed from the fabrication bed 32 and placed in a microwave oven 26 or a radio frequency (RF) furnace to be exposed to the electromagnetic radiation 44 having the frequency ranging from about 5 kHz to about 300 GHz. The use of a microwave furnace 26 is shown in FIG. 2 at reference numeral 208.

The liquid functional material 22 (alone or in combination with the liquid functional material 24) enhance(s) the absorption of the radiation 44, convert(s) the absorbed radiation to thermal energy, and promote(s) the transfer of the thermal heat to the build material 12 in contact therewith (i.e., in the portion(s) 40). In an example, the liquid functional material(s) 22 or 22 and 24 sufficiently elevate(s) the temperature of the build material 12 above the melting point(s), allowing curing (e.g., sintering, binding, fusing, etc.) of the build material particles 12 in contact with the liquid functional material(s) 22 or 22 and 24 to take place. In an example, the temperature is elevated about 50° C. above the melting temperature of the build material 12. The liquid functional material(s) 22 or 22 and 24 may also cause, for example, heating of the build material 12, below its melting point but to a temperature suitable to cause softening and bonding. It is to be understood that the first liquid functional material 22 is able to absorb and transfer to the build material 12 in contact therewith enough thermal energy to heat the build material 12 to at least 60° C. As examples, the build material 12 in contact with the first liquid functional material 22 may be heated to a temperature ranging from about 60° C. to about 2,500° C. It is also to be understood that portions 42 of the build material 12 that do not have the liquid functional material(s) 22 or 22 and 24 applied thereto do not absorb enough energy to fuse. Exposure to radiation 44 forms the 3D layer or part 46, as shown at reference numerals 108 in FIGS. 1 and 208 in FIG. 2.

In the example of the 3D printing method shown in FIG. 1, additional layers of the 3D part 46 may be formed by repeating reference numerals 102-108. For example, to form an additional layer of the 3D part 46, an additional layer of the build material 12 may be applied to the 3D part 46 shown in reference numeral 108 and the additional layer may be preheated, may have the liquid functional material(s) 22 or 22 and 24 selectively applied thereto, and may be exposed to radiation 44 to form that additional layer. Any number of additional layers may be formed. When the 3D object 46 is complete, it may be removed from the fabrication bed 32, and any uncured build material 12 may be washed and then reused.

In the example of the 3D printing method shown in FIG. 2, additional layers of the 3D part 46 may be formed as part of a green body. As shown in FIG. 2 at reference numeral 204, prior to exposure to the electromagnetic radiation 44, the build material 12 with the liquid functional material(s) 22 or 22 and 24 applied thereon may form the green body 48. The build material 22 that makes up the green body 48 is held together by capillary forces. It is to be understood that the green body 48 is not formed in portions 42 of the build material 12 that do not have the liquid functional material(s) 22 or 22 and 24 applied thereto (i.e., portion(s) 42 are not part of the green body 48).

At room temperature or at the temperature of the fabrication bed 32 (which may be heated), some of the fluid from the liquid functional material(s) 22 or 22 and 24 may evaporate after being dispensed. The fluid evaporation may result in the densification of the build material 12. The densified build material 12 may contribute to the formation of the green body 48 (or a layer of the green body 48) in the fabrication bed 32.

While the green body 48 (reference numeral 204) is shown as a single layer, it is to be understood that the green body 48 (and thus the resulting part 46, shown at reference numeral 208) may be built up to include several layers. Each additional layer of the green body 48 may be formed by repeating reference numerals 202-204. For example, to form an additional layer of the green body 48, an additional layer of the build material 12 may be applied to the green body 48 shown in reference numeral 204 and the additional layer may have the liquid functional material(s) 22 or 22 and 24 selectively applied thereto. Any number of additional layers may be formed.

When the green body 48 is complete, it may be exposed to several heating stages (e.g., initial, lower temperature heating to further densify the green body 48, followed by higher temperature sintering), or it may be exposed to a single heating stage that sinters the green body 48. In the example of method 200 involving multi-stage heating, the method 200 moves from reference numeral 204 to 206 to 208. In the example of method 200 involving single-stage heating, the method 200 moves from reference numeral 204 to 208.

In some examples (not shown in FIG. 2), the green body 48 may remain in the fabrication bed 32 for heating. In other examples, prior to any heating, the green body 48 may be removed from the fabrication bed 32 (or other support member) and may be placed in a suitable heat source 18 or in proximity of a suitable radiation source 20' (both of which are shown at reference numeral 206).

Examples of the heat source 18 include a microwave furnace 26 (which may also be considered a radiation source 20'), or an RF furnace, or devices capable of hybrid heating (i.e., conventional heating and microwave heating). Examples of the radiation source 20' (used for initial heating) include a UV, IR or near-IR curing lamp, IR or near-IR light emitting diodes (LED), halogen lamps emitting in the visible and near-IR range, or lasers with the desirable electromagnetic wavelengths. When the radiation source 20' and the second liquid functional material 24 are used, the type of radiation source 20' will depend, at least in part, on the type of active material used in the second liquid functional material 24. Performing initial heating with the radiation source 20' may be desirable when the second liquid functional material 24 is used. The active material in the liquid functional material 24 may enhance the absorption of the radiation, convert the absorbed radiation to thermal energy, and thus promote the initial heating of the green body 48.

When multi-stage heating is utilized, the green body 48 may first be heated, using heat source 18 or radiation source 20', to a temperature ranging from about 200° C. to about 600° C. Initial heating of the green body 48 removes at least some more fluid from the build material 12 to further compact and densify the green body 48 to form the green body 48'. Since initial heating of the green part 48 may remove at least some of the fluid therefrom, the (partially dried) green body 48' is denser and more compact than the initial green body 48. This initial heating promotes additional cohesion of the build material particles 12 within the green body 48'.

As mentioned above, the initial heating at reference numeral 206 may be performed, and the green body 48' may then be exposed to sintering at reference numeral 208, or the initial heating at reference numeral 206 may be bypassed, and the green body 48 may be exposed to sintering (reference numeral 208).

Whether or not the initial heating is performed, the green body 48 or 48' may then be exposed to electromagnetic radiation having a frequency ranging from about 5 kHz to about 300 GHz that will, in conjunction with liquid functional material(s) 22, 24 (as described above), sinter the green body 48 or 48'. The electromagnetic radiation may be emitted from a microwave oven 26 or other suitable radiation source 20 (emitting radiation with frequency ranging from about 5 kHz to about 300 GHz).

During sintering, the green body 48 or 48' may be heated at or above the melting temperature of the build material 12. In another example, heating of the green body 48, 48' elevates the temperature below the melting point of the green body 48, 48', but to a point that is suitable to cause sintering and bonding. As an example, the temperature may range from about 40% to about 90% of the melting temperature of the build material 12. In an example, the green body 48 or 48' may be heated to a temperature ranging from about 50% to about 80% of the melting temperature of the build material 12. The heating temperature thus depends, at least in part, upon the build material particles 12 that are utilized. The heating temperature may also depend upon the particle size and time for sintering (i.e., high temperature exposure time). In some examples, the heating temperature of the green body 48 or 48' ranges from about 60° C. to about 2500° C., or from about 1400° C. to about 1700° C. The exposure to electromagnetic radiation at reference numeral 208 sinters and fuses the build material 12 to form the layer or part 46, which may be even further densified relative to the green body 48 or 48'.

Whether the method 100 or the method 200 is used may depend in part on the build material 12 used. For example, the method 200 may be used for higher melting point ceramic build materials or composite build materials. The thermal stress associated with fusing layer by layer as shown in the method 100 may be too high for ceramics with high melting points. The method 100 may be used for some ceramics with lower melting points (e.g., soda-lime glass, glass frit, etc.). Whether a ceramic build material 12 may be used in the layer by layer method may depend upon the melting point of the ceramic, the ambient temperature in the print region, and the ability of the ceramic to endure thermal shock. As an example, the method 100 may be suitable for a ceramic having a melting point of 700° C. or lower. When the build material 12 is a polymer, either the method 100 or the method 200 may be used.

Figure 3:
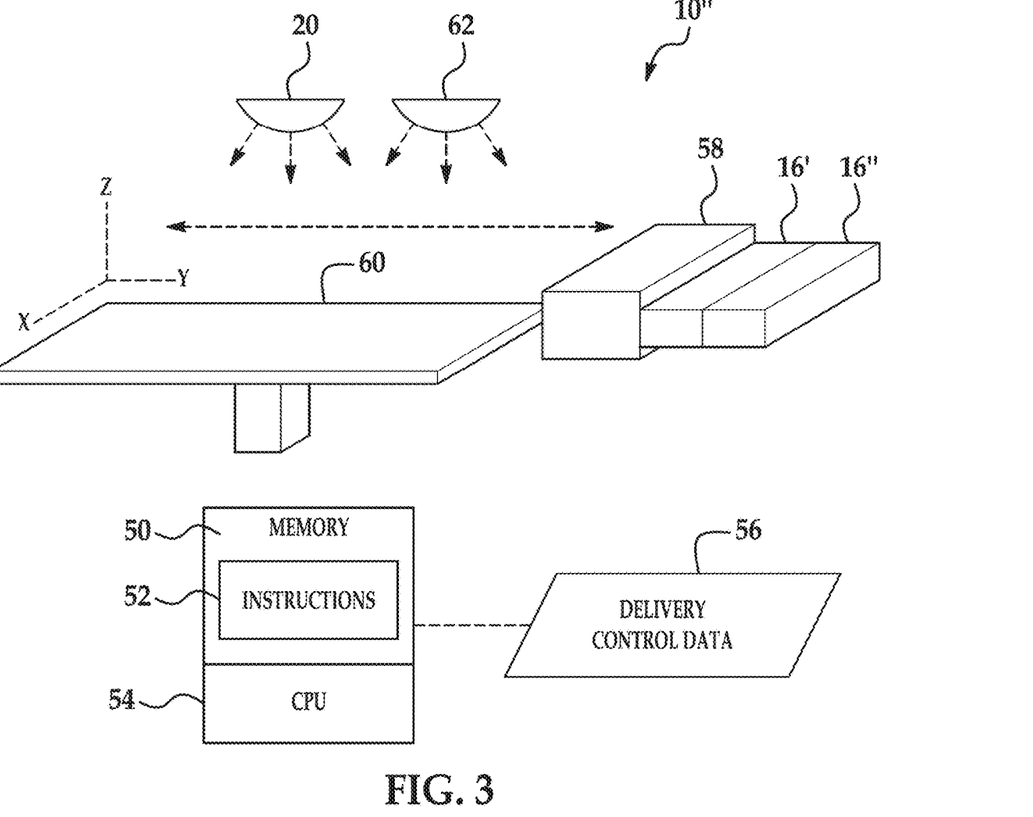
FIG. 3 is a simplified isometric view of an example of a 3D printing system disclosed herein.

Referring now to FIG. 3, another example of the printing system 10" is depicted. The system 10" includes a central processing unit 54 that controls the general operation of the additive printing system 10". As an example, the central processing unit 54 may be a microprocessor-based controller that is coupled to a memory 50, for example via a communications bus (not shown). The memory 50 stores the computer readable instructions 52. The central processing unit 54 may execute the instructions 52, and thus may control operation of the system 10" in accordance with the instructions 52. For example, the instructions may cause the controller to utilize a build material distributor 58 to dispense the build material 12, and to utilize liquid functional material distributor 16 (e.g., an inkjet applicator 16) to selectively dispense the liquid functional material 22 to form a three-dimensional part.

In this example, the printing system 10" includes a first liquid functional material distributor 16 to selectively deliver the first liquid functional material 22 to portion(s) 40 of the layer (not shown in this figure) of build material 12 provided on a support member 60. In this example, the printing system 10" also includes a second liquid functional material distributor 16' to selectively deliver the second liquid functional material 24 to portion(s) 40 of the layer (not shown in this figure) of build material 12 provided on a support member 60.

The central processing unit 54 controls the selective delivery of the liquid functional materials 22, 24 to the layer of the build material 12 in accordance with delivery control data 56.

In the example shown in FIG. 3, it is to be understood that the distributors 16, 16' are printheads, such as thermal printheads or piezoelectric inkjet printheads. The printheads 16, 16' may be drop-on-demand printheads or continuous drop printheads.

The printheads 16, 16' may be used to selectively deliver the first liquid functional material 22 and the second liquid functional material 24, respectively, when in the form of a suitable fluid. As described above, each of the liquid functional materials 22 and 24 includes an aqueous or non-aqueous vehicle to enable it to be delivered via the printheads 16, 16'.

In one example the printheads 16, 16' may be selected to deliver drops of the liquid functional materials 22, 24 at a resolution ranging from about 300 dots per inch (DPI) to about 1200 DPI. In other examples, the printhead 16, 16' may be selected to be able to deliver drops of the liquid functional materials 22, 24 a higher or lower resolution. The drop velocity may range from about 5 m/s to about 24 m/s and the firing frequency may range from about 1 kHz to about 100 kHz.

Each printhead 16, 16' may include an array of nozzles through which the printhead 16, 16' is able to selectively eject drops of fluid. In one example, each drop may be on the order of about 10 pico liters (pi) per drop, although it is contemplated that a higher or lower drop size may be used. In some examples, printheads 16, 16' are able to deliver variable size drops.

The printheads 16, 16' may be an integral part of the printing system 10", or they may be user replaceable. When the printheads 16, 16' are user replaceable, they may be removably insertable into a suitable distributor receiver or interface module (not shown).

In another example of the printing system 10", a single inkjet printhead may be used to selectively deliver both the first liquid functional material 22 and the second liquid functional material 24. For example, a first set of printhead nozzles of the printhead may be configured to deliver the first liquid functional material 22, and a second set of printhead nozzles of the printhead may be configured to deliver the second liquid functional material 24.

As shown in FIG. 3, each of the distributors 16, 16' has a length that enables it to span the whole width of the support member 60 in a page-wide array configuration. In an example, the page-wide array configuration is achieved through a suitable arrangement of multiple printheads. In another example, the page-wide array configuration is achieved through a single printhead with an array of nozzles having a length to enable them to span the width of the support member 60. In other examples of the printing system 10", the distributors 16, 16' may have a shorter length that does not enable them to span the whole width of the support member 60.

While not shown in FIG. 3, it is to be understood that the distributors 16, 16' may be mounted on a moveable carriage to enable them to move bi-directionally across the length of the support member 60 along the illustrated y-axis. This enables selective delivery of the liquid functional materials 22, 24 across the whole width and length of the support member 60 in a single pass. In other examples, the distributors 16, 16' may be fixed while the support member 60 is configured to move relative thereto.

As used herein, the term 'width' generally denotes the shortest dimension in the plane parallel to the X and Y axes shown in FIG. 3, and the term 'length' denotes the longest dimension in this plane. However, it is to be understood that in other examples the term 'width' may be interchangeable with the term 'length'. As an example, the distributors 16, 16' may have a length that enables it to span the whole length of the support member 60 while the moveable carriage may move bi-directionally across the width of the support member 60.

In examples in which the distributors 16, 16' have a shorter length that does not enable them to span the whole width of the support member 60, the distributors 16, 16' may also be movable bi-directionally across the width of the support member 60 in the illustrated X axis. This configuration enables selective delivery of the liquid functional materials 22, 24 across the whole width and length of the support member 60 using multiple passes.

The distributors 16, 16' may respectively include therein a supply of the first liquid functional material 22 and the second liquid functional material 24, or may be respectively operatively connected to a separate supply of the first liquid functional material 22 and second liquid functional material 24.

As shown in FIG. 3, the printing system 10" also includes a build material distributor 58. This distributor 58 is used to provide the layer (e.g., layer 14) of the build material 12 on the support member 60. Suitable build material distributors 58 may include, for example, a wiper blade, a roller, or combinations thereof.

The build material 12 may be supplied to the build material distributor 58 from a hopper or other suitable delivery system. In the example shown, the build material distributor 58 moves across the length (Y axis) of the support member 60 to deposit a layer of the build material 12. As previously described, a first layer of build material 12 will be deposited on the support member 60, whereas subsequent layers of the build material 12 will be deposited on a previously deposited layer.

It is to be further understood that the support member 60 may also be moveable along the Z axis. In an example, the support member 60 is moved in the Z direction such that as new layers of build material 12 are deposited, a predetermined gap is maintained between the surface of the most recently formed layer and the lower surface of the distributors 16, 16'. In other examples, however, the support member 60 may be fixed along the Z axis and the distributors 16, 16' may be movable along the Z axis.

Similar to the systems 10 and 10', the system 10" also includes the radiation source 20 or a microwave or RF oven (not shown) to apply energy to the deposited layer of build material 12 and the liquid functional material(s) 22 or 22 and 24 to cause the solidification of portion(s) 40 of the build material 12. Any of the previously described radiation sources 20 may be used. In an example, the radiation source 20 is a single energy source that is able to uniformly apply energy to the deposited materials, and in another example, radiation source 20 includes an array of energy sources to uniformly apply energy to the deposited materials.

In the examples disclosed herein, the radiation source 20 may be configured to apply energy in a substantially uniform manner to the whole surface of the deposited build material 12. This type of radiation source 20 may be referred to as an unfocused energy source. Exposing the entire layer to energy simultaneously may help increase the speed at which a three-dimensional object may be generated.

While not shown, it is to be understood that the radiation source 20 may be mounted on the moveable carriage or may be in a fixed position.

The central processing unit 54 may control the radiation source 20. The amount of energy applied may be in accordance with delivery control data 56.

The system 10" may also include a pre-heater 62 that is used to pre-heat the deposited build material 12 (as shown and described in reference to reference numeral 104 in FIG. 1). The use of the pre-heater 62 may help reduce the amount of energy that has to be applied by the radiation source 20.

To further illustrate the present disclosure, an example is given herein. It is to be understood that this example is provided for illustrative purposes and is not to be construed as limiting the scope of the present disclosure.

EXAMPLE

Example 1

An example 3D part was printed using an example of the liquid functional material disclosed herein. The liquid functional material included complex ferrite particles of iron, cobalt and manganese oxides, and the composition of the liquid functional material is shown in Table 1.

TABLE 1

| Component | Wt. % |
| --- | --- |
| Proprietary Co—Mn-Ferrite Dispersion (per dry ferrite mass) | 30% |
| 2-Pyrrolidone (co-solvent) | 10% |
| DANTOCOL ® DHE (co-solvent) | 10% |
| SURFYNOL ® 465 (surfactant) | 0.20% |
| PROXEL ® GXL Biocide | 0.05% |
| Water | Balance |

The liquid functional material was used in combination with a 12 wt % $SiO_2$ fusing/sintering aid, the composition of which is shown in Table 2.

TABLE 2

| Component | Wt. % |
| --- | --- |
| SNOWTEX ® ST-30LH $SiO_2$ (Mv~30 nm), per dry material | 20% |
| 2-Pyrrolidone (co-solvent) | 17% |
| SILQUEST ® A-1230 (co-solvent) | 5% |
| SURFYNOL ® 465 (surfactant) | 0.20% |
| PROXEL ® GXL Biocide | 0.05% |
| Water | Balance |

The build material used to print the example part was a 1:1 wt % mixture of AA-18 and AKP-53 alumina powders (available from Sumitomo).

For the Example part, the liquid functional material and the fusing/sintering aid were printed on the build material using a thermal ink jet printhead with a 1200×600 dpi resolution. The build layers were approximately 100 microns thick. The combination of the print resolution in the X and Y coordinates combined with the build material thickness defines a print resolution voxel. In this Example, approximately 9 drops of 12 ng mass of each LFM were deposited in each print resolution voxel.

The Example part was exposed to microwave radiation using a 2.45 GHz microwave source.

Figure 4:
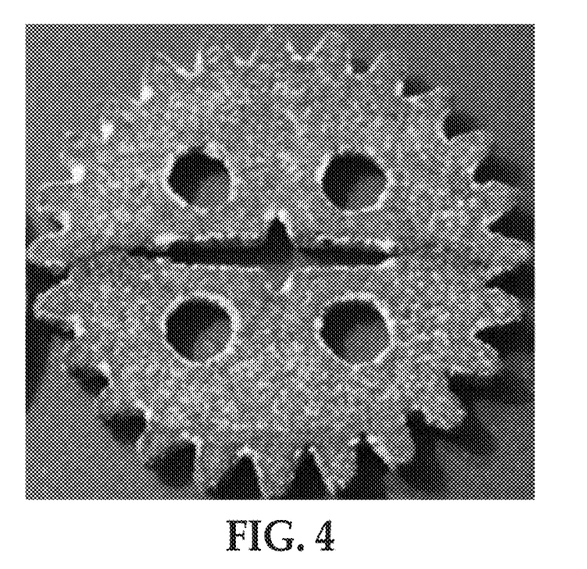
FIG. 4 is a photographic image of a 3D printed part formed by an example of the 3D printing method disclosed herein.

The formed 3D part is shown in FIG. 4. As illustrated, the liquid functional material efficiently functioned as a microwave susceptor in the 3D printing process.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range. For example, a range from about 5 kHz to about 300 GHz should be interpreted to include the explicitly recited limits of about 5 kHz to about 300 GHz, as well as individual values, such as 5 kHz, 225.5 kHz, 500 MHz, 200 GHz, etc., and sub-ranges, such as from about 350 kHz to about 100 GHz, from about 60 kHz to about 525 MHz, etc. Furthermore, when "about" is utilized to describe a value, this is meant to encompass minor variations (up to +/−10%) from the stated value.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A three-dimensional (3D) printing method, comprising:
    applying a build material;
    selectively applying, by thermal inkjet printing or piezoelectric inkjet printing, a first liquid functional material including ferromagnetic nanoparticles on at least a portion of the build material, wherein the ferromagnetic nanoparticles are selected from the group consisting of a ferrite, a combination of an iron oxide and a ferromagnetic metal oxide, and combinations thereof; and
    exposing the build material to electromagnetic radiation having a frequency ranging from about 5 kHz to about 300 GHz, thereby sintering the portion of the build material in contact with the first liquid functional material;
    wherein the build material is a ceramic build material, and wherein the first liquid functional material heats the at least the portion of the ceramic build material to a temperature sufficient to sinter the at least the portion of the ceramic build material, the temperature ranging from about 1400° C. to about 2500° C.

2. The 3D printing method as defined in claim 1 wherein the ferromagnetic nanoparticles are present in the first liquid functional material in an amount ranging from about 0.1 wt % to about 50 wt % based on a total wt % of the first liquid functional material.

3. The 3D printing method as defined in claim 1 wherein the first liquid functional material further includes water, a co-solvent, a surfactant, and a dispersant selected from the group consisting of a) a small molecule anionic dispersant b) a short chain polymer dispersant; or c) a small molecule non-ionic dispersant; or d) a combination of a) or b) with c).

4. The 3D printing method as defined in claim 1 wherein any one or more of:
    the iron oxide is iron (II) oxide, iron (III) oxide, or iron (II, III) oxide;
    the ferromagnetic metal oxide is cobalt (II) oxide, cobalt (II, III) oxide, manganese (III) oxide, or combinations thereof; or
    the ferrite is selected from the group consisting of barium ferrite ($BaFe_{12}O_{19}$), cobalt ferrite ($CoFe_2O_4$), cobalt-zinc ferrite ($Co_{0.5}Zn_{0.5}Fe_2O_4$), nickel ferrite ($NiFe_2O_4$), nickel-zinc ferrite ($Ni_{0.5}Zn_{0.5}Fe_2O_4$), zinc ferrite ($ZnFe_2O_4$), and complex ferrites.

5. The 3D printing method as defined in claim 1 wherein exposing the build material to the electromagnetic radiation raises a temperature of the portion of the build material in contact with the first liquid functional material to at least 60° C.

6. The 3D printing method as defined in claim 1 wherein the ceramic build material includes metal oxide ceramics, inorganic glasses, carbides, nitrides, borides, or a combination thereof.

7. The 3D printing method as defined in claim 1, further comprising selectively applying a second liquid functional material on the at least the portion of the build material in contact with the first liquid functional material.

8. The 3D printing method as defined in claim 7 wherein the second liquid functional material includes a dispersion of particles with high microwave radiation absorptivity.

9. The 3D printing method as defined in claim 1 wherein the ferromagnetic nanoparticles comprise the combination of the iron oxide and the ferromagnetic metal oxide.

10. The 3D printing method as defined in claim 9 wherein:
    the iron oxide is iron (II) oxide, iron (III) oxide, or iron (II, III) oxide; and the ferromagnetic metal oxide is cobalt (II) oxide, cobalt (II, III) oxide, manganese (III) oxide, or combinations thereof.

11. A three-dimensional (3D) printing method, comprising:
   applying a build material;
   selectively applying, by thermal inkjet printing or piezoelectric inkjet printing, a first liquid functional material including ferromagnetic nanoparticles on at least a portion of the build material, wherein the ferromagnetic nanoparticles are selected from the group consisting of a ferrite, a combination of an iron oxide and a ferromagnetic metal oxide, and combinations thereof;
   exposing the build material to electromagnetic radiation having a frequency ranging from about 5 kHz to about 300 GHz, thereby sintering the portion of the build material in contact with the first liquid functional material; and
   selectively applying a second liquid functional material on the at least the portion of the build material in contact with the first liquid functional material;
   wherein the build material is a ceramic build material, wherein the second liquid functional material heats the at least the portion of the ceramic build material to an initial temperature below 500° C., and wherein the first liquid functional material heats the at least the portion of the ceramic build material to a temperature sufficient to sinter the at least the portion of the ceramic build material, the temperature ranging from about 1400° C. to about 2500° C.

12. A three-dimensional (3D) printing method, comprising:
   applying a build material;
   selectively applying, by thermal inkjet printing or piezoelectric inkjet printing, a first liquid functional material including ferromagnetic nanoparticles on at least a portion of the build material, wherein the ferromagnetic nanoparticles are selected from the group consisting of a ferrite, a combination of an iron oxide and a ferromagnetic metal oxide, and combinations thereof; and
   exposing the build material to electromagnetic radiation having a frequency ranging from about 5 kHz to about 300 GHz, thereby sintering the portion of the build material in contact with the first liquid functional material;
   wherein the build material is a ceramic build material, and wherein the ferromagnetic nanoparticles consist of a mixture of $Fe_2O_3$, $CoO$, and $Mn_2O_3$ nanoparticles.

* * * * *